United States Patent [19]

Visani et al.

[11] Patent Number: 5,183,851
[45] Date of Patent: Feb. 2, 1993

[54] LOW HAZE TRANSPARENT COMPOSITIONS AND PROCESSES FOR PREPARING THEM

[75] Inventors: Francesco Visani; Carlo Tavazzani; Giuseppe Ajroldi, all of Milan; Giovanni Castiglioni, Locate, all of Italy

[73] Assignee: ELF Atochem ITALIA S.r.l., Milan, Italy

[21] Appl. No.: 752,977

[22] Filed: Sep. 3, 1991

Related U.S. Application Data

[63] Continuation of Ser. No. 455,796, Dec. 26, 1989, abandoned, which is a continuation of Ser. No. 117,551, Nov. 6, 1987, abandoned.

[30] Foreign Application Priority Data

Nov. 11, 1986 [IT] Italy .............................. 22280 A/86

[51] Int. Cl.⁵ ..................... C08L 33/12; C08L 51/04; C08F 265/06
[52] U.S. Cl. ........................................ 525/85; 525/73; 525/76; 525/77; 525/79; 525/80; 525/81; 525/83; 525/309; 525/902; 525/903
[58] Field of Search ................. 525/73, 76, 77, 79, 525/80, 81, 83, 85, 902, 903

[56] References Cited

U.S. PATENT DOCUMENTS

| | | | |
|---|---|---|---|
| 3,793,402 | 2/1974 | Owens | 525/902 |
| 3,808,180 | 4/1974 | Owens | 525/291 |
| 3,830,878 | 8/1974 | Kato | 525/902 |
| 3,914,338 | 10/1975 | Kreig | 525/902 |
| 4,173,596 | 11/1979 | DeWitt | 525/85 |
| 4,180,529 | 12/1979 | Hofmann | 525/85 |
| 4,341,883 | 7/1982 | Gift | 525/902 |
| 4,521,568 | 6/1985 | Mori | 525/902 |

*Primary Examiner*—David J. Buttner
*Attorney, Agent, or Firm*—Morgan & Finnegan

[57] ABSTRACT

This invention relates to low haze impact-resistant transparent compositions, comprising:
(a) 40–99% by weight of a thermoplastic resin based on homopolymers and/or copolymers of alkyl-methacrylates with minor amounts of alkyl-acrylates, wherein the alkyl group contains from 1 to 8 carbon atoms, and
(b) 60–1% by weight of a polymer having a multi-layer structure, based on elastomers arranged sequentially to thermoplastic resins as defined in step (a).

23 Claims, No Drawings

© 2024

LOW HAZE TRANSPARENT COMPOSITIONS AND PROCESSES FOR PREPARING THEM

This is a continuation of co-pending application Ser. No. 455,796, filed Dec. 26, 1989, now abandoned, which is a continuation of Ser. No. 117,551, filed on Nov. 6, 1987 now abandoned.

DESCRIPTION OF THE INVENTION

Field of the Invention

The present invention relates to low haze impact-resistant transparent compositions, and to processes for preparing them.

More particularly, the present invention relates to impact-resistant transparent compositions endowed with low-haze characteristics within a wide temperature range, based on homopolymers and/or copolymers of alkyl-methacrylates and alkylacrylates, and to the relevant preparation processes.

BACKGROUND OF THE INVENTION

It is known that, in order to obviate the fragility of thermoplastic materials, a generally used technique consists in blending them with relatively small amounts of elastomers.

According to these techniques, certain amounts of elastomers, typically within the range of from 5 to 35% by weight, are incorporated and dispersed inside the rigid thermoplastic matrix and the resulting material is thereby given characteristics of impact and crack resistance, elongation at break, and crack energy several times higher than the thermoplastic resin used as the starting material.

In case of transparent polymers such as, e.g., the acrylic resins, dispersing inside them an elastomeric phase according to the known techniques may have an adverse effect on optical properties, such as an increase in haze, which is the more marked the more different from each other are the refractive indices of the continuous resin phase and of the dispersed elastomeric phase.

In order to obviate such a drawback, compositions were proposed, e.g., in U.K. patents Nos. 1,001,953 and 994,924, which are based on acrylic resins, such as polymethylmethacrylate, intimately blended with grafted materials comprising an elastomeric core coated with analogous acrylic resins.

Finished articles obtained from these compositions showed good mechanical properties, and values of optical properties similar to those of the acrylic resin used as the starting material, at room temperature, but they tended to opacify at even slightly different temperatures.

Further transparent compositions were subsequently proposed, wherein the above drawback was overcome.

These compositions, comprising a continuous phase, the acrylic resin, and a dispersed phase constituted by substantially spherical polymeric particles of multi-layer type, make it possible to obtain finished articles endowed with satisfactory optical properties over a wide temperature range.

The multi-layer particles consist of a central core, based on acrylic resins, on which are grafted a plurality of layers of resin, or of acrylic elastomer, having different compositions.

But in this case too, the compositions are not without drawbacks; in fact, such multi-layer products, obtained in aqueous emulsion, are constituted by particles having variable dimensions and diameters, with values which, although having an average value within the required limits to provide a reinforced thermoplastic matrix, are distributed over very wide ranges.

This fact may gave an adverse effect on the properties of the finished articles, in that the particles having dimensions smaller than the average value turn out not to be efficacious in improving the mechanical properties, and the particles having larger dimensions can reduce the optical qualities of the end products to which impact-resistance properties have been imparted.

Besides the above, the end articles obtained from acrylic resins modified with the multi-layer polymeric products, even if they show rather satisfactory optical properties with varying temperatures, nevertheless show a more or less light blue hue, which cannot be eliminated even if suitable optical modifiers are used. Such a phenomenon, generally indicated by the term "color reversal", can be observed in transparent heterophase systems when the refractive index of the dispersed phase is even only slightly higher than that of the continuous phase.

Thus, such end articles have poorer aesthetic properties than those of the acrylic resin as such.

DETAILED DESCRIPTION OF THE INVENTION

It has now been discovered, in accordance with the present invention, that the above drawbacks may be overcome by means of low haze impact-resistant transparent compositions which comprise:

(a) 40–99% by weight of a thermoplastic resin based on homopolymers and/or copolymers of alkyl esters of methacrylic acid with alkyl esters of acrylic acid, wherein the alkyl group contains from 1 to 8 carbon atoms, and (b) 60–1% by weight of a polymer having a multilayer structure, and comprising:

- a central core based on a cross-linked elastomer intimately blended with an acrylic resin as defined in (a);
- if desired a first layer of the said resin grafted on said central core;
- a second layer of cross-linked elastomer grafted on said first resin layer; and
- a third layer of resin grafted on said second layer of cross-linked elastomer.

Examples of compositions according to the present invention are those wherein the multi-layer polymer is constituted by:

- 5–60% by weight of central core;
- 0–55% by weight of a first grafted layer of acrylic resin;
- 20–50% by weight of a cross-linked elastomer present as the second layer; and
- 15–35% by weight of external acrylic resin present as the third layer.

In the central core, the amount of elastomer is within the range of from 0.01 to 10% by weight of the entire particle.

Preferred compositions are those wherein the multi-layer polymer is constituted by:

- 8–30% by weight of central core;
- 10–40% by weight of first grafted layer of acrylic resin;
- 25–45% by weight of cross-linked elastomer present as the second layer; and 18-30% by weight of external acrylic resin present as the third layer.

In the central core, the preferred amount of elastomer is within the range of from 0.3 to 7% by weight of the entire particle.

The alkyl esters of methacrylic acid which may be used to prepare the acrylic resin used in the compositions of the present invention are selected from the class consisting of methyl methacrylate, ethyl methacrylate, isopropyl methacrylate, sec.-butyl methacrylate, tert.-butyl methacrylate, and so forth, possibly blended with minor amounts of alkyl or alkoxy-alkyl esters of acrylic acid or of vinyl monomers.

A preferred product is methyl methacrylate containing 0-25% by weight, preferably 5-20% by weight, of one or more comonomers selected from the class consisting of acrylic acid esters, such as, e.g., ethyl, methyl, butyl, isopropyl acrylate, etc., the alkoxy-alkyl acrylates such as 2-methoxy-ethyl acrylate and the vinyl monomers, such as, e.g., acrylonitrile, acrylamide, styrene and its derivatives.

A still more preferred product is methyl methacrylate containing 5-20% by weight of ethyl or methyl acrylate.

The cross-linked elastomer used in the multi-layer polymer used in the compositions of the present invention is selected from the class consisting of products having a glass transition temperature equal to, or lower than, 25° C., and preferably lower than $-10°$ C.

Examples of particularly suitable elastomers for use in the present composition are those which may be obtained from alkyl esters of acrylic acid, wherein the alkyl group contains from 1 to 8 carbon atoms, such as n-butyl acrylate, isobutyl acrylate, 2-ethyl-hexyl acrylate, methyl acrylate, ethyl acrylate, propyl acrylate, isopropyl, acrylate, etc., or from alkoxyalkyl acrylates, such as 2-methoxy-ethyl acrylate, or from monomers having a double ethylenic unsaturation, such as butadiene, substituted butadiene such as isoprene, chloroprene, 2,3-dimethylbutadiene, if desired in mixture with amounts of vinylic monomers of up to 30% by weight.

The preferred vinylic monomer is styrene and its derivatives, such as methyl-styrenes, such as ortho- and para-methyl-styrene, ortho- and para-ethyl-styrene, alpha-methyl-styrenes, mono-, di-, tri-, tetra- and penta-chloro-styrene, and so forth.

The preferred elastomer in the composition of the present invention is the copolymer of butyl acrylate containing styrene in amounts within the range of from 5 to 30%, preferably of from 10 to 20%, by weight.

The elastomer used in the central core may be the same as, or different from, that used in the second layer of the multi-layer copolymer used to produce the compositions of the present invention.

The layers of acrylic resin, and of cross-linked elastomer constituting the polymer having the multi-layer structure used in the compositions of the present invention, are respectively grafted on the central core and on each other, by means of suitable grafting and cross-linking agents having two double bonds in their molecule, with different degrees of reactivity.

These co-monomers are used in amounts within the range of from 0.05 to 2% by weight, and preferably of from 0.1 to 1% by weight, relative to the total monomers of each layer, including the central core, and are selected from the class consisting of allyl acrylate, diallyl maleate, allyl methacrylate, diallyl phthalate, diallyl fumarate, triallyl cyanurate, and so forth.

The elastomer may furthermore be cross-linked by means of normal cross-linking monomers per se well known in the art.

Such monomers are used in amounts within the range of from 0 to 5% by weight relative to the elastomer; they are selected from the class of those having a double unsaturation, and perform the function of creating permanent cross-links between the elastomer chains. Example of cross-linkers are: ethyleneglycol diacrylate and dimethylacrylate, di-, tri-, tetra-ethyleneglycol dimethacrylate and diacrylate, 1,3- and 1,4-butyleneglycol diacrylate and dimethacrylate, divinylbenzene, trivinylbenzene, and so forth.

In the elastomer, there may be present from 0.1 to 2% by weight of vinyl monomers containing a functional group of the polar type, performing the function of establishing further cross-linkages between the chains. Examples of such products are acrylic acid, methacrylic acid, glycidyl methacrylate or acrylate, acrylamide, methacrylamide, and so forth.

The low haze, impact-resistant transparent compositions of the present invention are obtained by means of a process comprising blending:

(a) 40-90% by weight of an acrylic resin based on homopolymers and/or copolymers of alkyl esters of methacrylic acid with alkyl esters of acrylic acid, wherein the alkyl group contains from 1 to 8 carbon atoms, and (b) 60-1% by weight of a polymer having a multi-layer structure, obtained according to the following steps:

(i) preparation of a seed of elastomer in aqueous emulsion by means of feed and polymerization of monomers selected from the alkyl or alkoxy-alkyl esters of acrylic acid, wherein the alkyl group contains from 1 to 8 carbon atoms, and those containing a double ethylenic unsaturation, if desired in admixture with up to 30% by weight of vinyl monomer, and containing from 0.05 to 2% by weight of graft monomers;

(ii) swelling of the above seed, by means of the absorption of one or more monomers which are alkyl esters of methacrylic acid, wherein the alkyl group contains from 1 to 8 carbon atoms, and if desired in mixture with minor amounts of $C_1-C_8$ alkyl or alkoxy-alkyl esters of acrylic acid, and containing 0.05-2% by weight of grafting monomers;

(iii) polymerization of said alkyl esters absorbed in the elastomeric seed, to yield the central core;

(iv) if desired growth of said central core with a first layer of acrylic resin by means of the feed and polymerization of acrylic esters of methacrylic acid, if desired in admixture with minor amounts of $C_1-C_8$ alkyl or alkoxy-alkyl esters of acrylic acid, and containing 0.05-2% by weight of grafting monomers;

(v) growth of the so-obtained particles with a second layer of elastomer, grafted on the first layer by means of the feed and polymerization of monomers selected from the $C_1-C_8$ alkyl or alkoxy-alkyl esters of acrylic acid and those having a double ethylenic unsaturation, if desired in mixture with amounts of vinyl monomer of up to 30% by weight, and containing 0.05-2% by weight of grafting monomers;

(vi) growth of the so-obtained particles with a third layer of resin, grafted on the second layer of elastomer, by means of the feed and polymerization of acrylic esters of methacrylic acid, if desired in mixture with minor amounts of $C_1-C_8$ alkyl or alkoxy-alkyl esters of acrylic acid and of vinylic monomers, until the desired particle size is reached.

At the end of the steps from (i) to (vi), an aqueous emulsion is obtained of polymeric particles having a multi-layer structure, at a concentration of from 25 to 50% by weight, and having diameters lower than 500 nm, but preferably within the range of from 100 to 300 nm.

The distribution of the values of diameters within these ranges is very narrow; from which it results, from the microphotographs obtained by transmission electron microscopy, that the variation coefficient relative to the average value of the diameters of the particles is lower than 0.1.

The polymeric product with multi-layer structure may be recovered from the emulsion by known techniques, such as, e.g., precipitation by coagulation, spray-drying, thin-film drying, and so forth.

According to a preferred form of practical embodiment of the process of the present invention, the polymerization reactions which are carried out in steps (i) through (vi) are carried out in the presence of the usual polymerization surfactants and initiators per se well known in the art.

Examples of surfactants are: sulphonated alkylbenzenes, such as sodium dodecyl-benzene sulphonate, sulphonated $(C_8–C_{18})$-alkyl-phenoxy-polyethylenes, sodium lauryl sulphate, long-chain amine salts, salts of sulphonic acids or of carboxylic acids of long-chain linear or branched paraffins, such as the sodium salt of $(C_{14}–C_{16})$-paraffin-sulphonates, and so forth.

Examples of free-radical initiators are:

peroxides, e.g., peranhydrides, peresters, persulphates, hydroperoxides, hydrogen peroxide, and so forth;

azo-compounds, e.g., azo-bis-isobutyronitrile, and so forth.

Preferably, as the initiators redox couples are used, such as combinations of:

tert.-butylhydroperoxide, tert.-amyl hydroperoxide, cumene hydroperoxide, di-isopropyl-benzene hydroperoxide, tert.-butyl peracetate, etc., coupled with sodium formaldehyde sulphoxylate, sodium metabisulphite, sodium hydrosulphite, and so forth.

The polymerization reactions described in the steps from (i) to (vi) may be carried out batchwise or semi-continuously, at temperatures within the range of from 15° to 70° C., and, more preferably, of from 15° to 60° C. in case of a batchwise reaction mode, and of from 30° to 70° C. in case of a semi-continuous reaction mode.

For each step, amounts of initiator within the range of from 0.01 to 2% by weight and of surfactant of from 0 to 2% by weighty, relative to the total monomers, are used.

The amounts of surfactants used in the steps following the first step are always such as to avoid the germination of new particles.

To the low haze impact-resistant transparent compositions of the present invention, normal additives per se well known in the art may be added, such as thermal and light stabilizers, antioxidants, dyes, lubricants, and so forth.

The compositions of the present invention are characterized by the following properties:

light transmittance at room temperature, on 3-mm thick specimens: higher than 90%, as measured according to ASTM D 1003;

haze at room temperature, on 3-mm thick specimens: within the range of from 1.5 to 2.5%, as measured according to ASTM D 1003;

light transmittance at 50° C.: higher than 80%;

haze at 50° C.: lower than 10%;

"color reversal:" absent;

flexural elastic modulus: within the range of from 1000 to 3000 MPa, as measured according to ASTM D 790;

tensile yielding stress: within the range of from 25 to 60 MPa, as measured according to ASTM D 638;

elongation at break by tensile stress: within the range of from 25 to 100%, as measured according to ASTM D 638;

"Charpy" impact resistance: within the range of from 2 to 10 KJ/m$^2$, as measured according to ASTM D 256;

"Charpy" impact resistance, with sharp notch: within the range of from 1 to 6 kJ/m$^2$;

Rockwell hardness: within the range of from 35 to 90 (scale M), as measured according to ASTM D 785; and Vicat grade (5 kg, 50° C./min): within the range of from 80° to 100° C., as measured according to ISO 306 B method, rate A.

The method used in order to carry out the measurement of the "Charpy" impact resistance with sharp notch is based on the principles of crack mechanics for the evaluation of the toughness of impact-resistant composite materials with which a considerable plastic deformation is associated (J. R. Rice, P. C. Paris, J. G. Merkle, ASTM STP 536, 1973, 231). The herein-adopted evaluation technique is a simplification of such principles. It was developed in such a way as to measure the toughness during the crack propagation step (T. Casiraghi, G. Castiglioni, Proceedings of the Third National Meeting, Turin May 22–23, 1986), under extremely critical conditions of notch sharpness, which can occur in the end articles connected with or related to defects, junctures, microcracks, and so forth.

The tests are carried out according to the Charpy geometry on press-molded specimens having a thickness (B) of 3 mm, a width (W) of 10 mm, and a length of 90 mm. The depth (a) of the sharp notch, produced by means of a normal razor blade, is 5.4 mm, and the mutual distance of the supports is 70 mm.

The so-obtained products undergo an impact at the speed of 0.5 m/second.

The impact strength ($J_T^*$) is determined by normalizing the total dissipated energy ($U_R$) necessary for completely breaking the specimen relatively to the resisting section $$J_T^* = U_R/B[W-a].$$

EXAMPLES

In order still better to understand the present invention and to practice it here follow some illustrative but not limitative examples.

EXAMPLE 1 (COMPARATIVE EXAMPLE)

The emulsion A and the solutions B and C are separately prepared.

| | Parts by Weight |
|---|---|
| Emulsion A | |

-continued

| | Parts by Weight |
|---|---|
| Butyl acrylate | 80.55 |
| Styrene | 18.95 |
| Allyl methacrylate | 0.5 |
| Water | 100.0 |
| Sodium salt of sulphonated linear ($C_{14}$–$C_{16}$)-paraffin | 0.6 |
| Sulphuric acid | 0.001 |
| Solution B | |
| Water | 14.85 |
| tert.-Butyl-hydroperoxide | 0.05 |
| Solution C | |
| Water | 14.85 |
| Rodite A (sodium foraldehyde sulphoxylate of formula $CH_2OH.SO_2Na.2H_2O$) | 0.15 |

To a reactor equipped with a condenser, 72 parts of demineralized water, 0.5 parts of sodium salt of a sulphonated linear ($C_{14}$–$C_{16}$) paraffin, and 0.001 parts of sulphuric acid are charged.

The resulting mixture is stirred under a nitrogen atmosphere, and its temperature is increased to 55° C., then, in order:
4.44 parts of emulsion A
0.33 parts of solution B
0.33 parts of solution C
are added.

The reactor is maintained at 55° C. for 20 minutes, then over a period of 180 minutes the residual amounts of emulsion A and of solutions B and C are added.

The reactor is maintained for 1 hour at the temperature of 55° C. and is then cooled; the obtained latex contains approximately 33% of polymer.

To a reactor equipped with condenser, 75.3 parts of water and 7.8 parts of elastomer seed latex (previously prepared) are added.

The resulting mixture is stirred under a nitrogen atmosphere, and its temperature is increased to 60° C., then the following emulsions and solutions, separately prepared, are added:

| 1) emulsion D | from time 0 to 9 hours |
|---|---|
| 2) emulsion E | from 9 hours to 15 hours |
| 3) solution F | from time 0 to 15 hours |
| 4) solution G | from time 0 to 15 hours |

| | Parts by Weight |
|---|---|
| Emulsion D | |
| Butyl acrylate | 47.52 |
| Styrene | 11.18 |
| Allyl methacrylate | 0.5 |
| Water | 100.0 |
| Sodium salt of sulphonated linear ($C_{14}$–$C_{16}$)-paraffin | 0.35 |
| Sulphuric acid | 0.0005 |
| Solution E | |
| Methyl methacrylate | 34.85 |
| Butyl acrylate | 5.25 |
| Styrene | 0.98 |
| Solution F | |
| Water | 30.3 |
| tert.-Butyl-hydroperoxide | 0.05 |
| Solution G | |
| Water | 30.3 |
| Rodite A (sodium formaldehyde sulphoxylate of formula $CH_2OH.SO_2Na.2H_2O$) | 0.15 |

The reactor is maintained at the temperature of 60° C. for 1 hour, and is then cooled. The so-obtained latex has a content of approximately 33.8% of polymer, and is constituted by substantially mono-dispersed particles of grafted acrylic elastomer, having a diameter of approximately 200 nm (variance coefficient of 0.05).

The latex is then coagulated by high-temperature treatment with calcium chloride in water at concentrations of 0.3%. The polymer, as a fine powder, is filtered, washed with water, and dried.

The so-obtained grafted acrylic elastomer is blended, in varius ratios, with a copolymer of methyl methacrylate and ethyl acrylate in a weight ratio of 96/4, and having an intrinsic viscosity in chloroform at 25° C. of 65 ml/g.

The blends are extruded to yield impact-resistant granules endowed with optical and physical-mechanical characteristics as reported below in Table 1.

EXAMPLE 2

Preparation of a seed of acrylic elastomer:

To a reactor equipped with a condenser 72 parts of demineralized water, 0.5 parts of sodium salt of a sulphonated linear ($C_{14}$–$C_{16}$) paraffin, and 0.001 parts of sulphuric acid are charged.

The resulting mixture is stirred under a nitrogen atmosphere, and its temperature is increased to 55° C. Then, in the following order, separately prepared emulsions and solutions are added.
4.44 parts of emulsion A
0.33 parts of solution B
0.33 parts of solution C The reactor is maintained at 55° C. for 20 minutes, then over a time of 180 minutes the residual amounts of emulsion A and solutions B and C are added.

The reactor is maintained 1 hour at the temperature of 55° C. and is then cooled. The obtained latex contains approximately 33% of polymer

| | Parts by Weight |
|---|---|
| Emulsion A | |
| Butyl acrylate | 83.95 |
| Styrene | 15.55 |
| Allyl methacrylate | 0.5 |
| Water | 100.0 |
| Sodium salt of sulphonated linear ($C_{14}$–$C_{16}$)-paraffin | 0.6 |
| Sulphuric acid | 0.001 |
| Solution B | |
| Water | 14.85 |
| tert.-Butyl-hydroperoxide | 0.05 |
| Solution C | |
| Water | 14.85 |
| Rodite A | 0.15 |

Preparation of a grafted multi-layer acrylic elastomer:

To a reactor equipped with condenser, the following products are charged:

| | Parts by Weight |
|---|---|
| Water | 59.3 |
| Seed latex | 9.4 |
| Sodium salt of sulphonated linear ($C_{14}$–$C_{16}$)-paraffin | 0.075 |

The resulting mixture is stirred under a nitrogen atmosphere at the temperature of 25° C., then a solution of 11.08 parts of methyl methacrylate, 1.23 parts of ethyl acrylate, and 0.062 parts of allyl methacrylate is charged.

The stirring is maintained at room temperature for a time of approximately 2 hours, then a solution of 0.003 parts of tert.-butyl-hydroperoxide in 3 parts of water, and thereafter a solution of 0.009 parts of Rodite A in 3 parts of water are charged.

The temperature is increased over a period of approximately 30 minutes to 55° C., then, starting at this time, the following additions are carried out:

| | |
|---|---|
| (1) emulsion D | from time 0 to 4 hours. |
| (2) emulsion E | from 4 hours to 10 hours. |
| (3) solution F | from 10 hours to 13 hours. |
| (4) soltuion G | from time 0 to 13 hours. |
| (5) solution H | from time 0 to 13 hours | diameter of approximately 185 nm (variance coefficient of 0.04).

The latex is then coagulated by high-temperature treatment with calcium chloride in water at a concentration of 0.35%. The polymer, which has the form of a fine powder, is filtered, washed with water, and dried.

The so-obtained grafted acrylic elastomer is blended, in various ratios, with a copolymer of methyl methacrylate and ethyl acrylate in a weight ratio of 96/4 and having an intrinsic viscosity in chloroform at 25° C. of 65 ml/g.

The blends are extruded to yield impact-resistant granules having optical and physical-mechanical characteristics as reported below in Table 1.

TABLE 1

| PROPERTY (A) | METHOD | UNIT OF MEASURE | PMMA (B) | Example 1 (% of grafted) | | | Example 2 (% of grafted) | | |
|---|---|---|---|---|---|---|---|---|---|
| | | | | 16 | 25 | 33 | 21 | 30 | 36 |
| OPTICAL PROPERTIES | | | | | | | | | |
| Transmittance | | | | | | | | | |
| at 23° C. | ASTM D 1003 | % | 91.5 | 88 | 88.5 | 89.2 | 90.5 | 91.2 | 91 |
| at 50° C. | ASTM D 1003 | % | 91.5 | 73 | 73.5 | 74 | 83 | 82.5 | 83 |
| Haze | | | | | | | | | |
| at 23° C. | ASTM D 1003 | % | 0.5 | 2.5 | 3.0 | 2.8 | 1.8 | 1.5 | 2.0 |
| at 50° C. | ASTM D 1003 | % | 0.5 | 26 | 28.5 | 27 | 8 | 7.5 | 8 |
| "Colour Reversal" | | | absent | absent | absent | absent | absent | absent | absent |
| MECHANICAL PROPERTIES | | | | | | | | | |
| Flexural Elastic Modulus | ASTM D 790 | MPa | 3200 | 2550 | 2100 | 1750 | 2550 | 2350 | 2100 |
| Tensile Stress | ASTM D 638 | | | | | | | | |
| Yield Stress | | MPa | 73 | 50 | 44.5 | 38 | 50 | 46 | 40 |
| Elongation at break | | % | 5 | 10 | 15 | 40 | 42 | 65 | 94 |
| Impact resistance | | | | | | | | | |
| Charpy - "blunt notch" | ASTM D 256 | kJm$^{-2}$ | 1.5 | 4.0 | 5.5 | 6.5 | 4.7 | 5.3 | 6.5 |
| Charpy - "sharp notch" | see specification | kJm$^{-2}$ | 0.25 | 1.8 | 2.5 | 3.5 | 3.7 | 4.1 | 4.6 |
| Rockwell Hardness | ASTM D 785 | Scale M | 93 | 72 | 44 | 4 | 71 | 63 | 44 |
| THERMAL PROPERTIES | | | | | | | | | |
| Vicat, 5 kg, 50° C./minute | ISO 306 Method, B, Rate A | °C. | 102 | 100 | 98 | 94 | 98 | 96 | 92 |

(A) The mechanical and thermal tests were performed on press-moulded specimens, in accordance with ASTM D 788 Standard.
(B) 96/4 by weight methyl methacrylate/ethyl acrylate copolymer, intrinsic viscosity (CHCl$_3$, 5° C.) of 65 ml/g.

| | Parts by Weight |
|---|---|
| Emulsion D | |
| Methyl methacrylate | 23.08 |
| Ethyl acrylate | 2.56 |
| Allyl methacrylate | 0.13 |
| Water | 27.8 |
| Sodium salt of sulphonated linear (C$_{14}$–C$_{16}$)-paraffin | 0.17 |
| Sulphuric acid | 0.0002 |
| Emulsion E | |
| Butyl acrylate | 31.16 |
| Styrene | 5.77 |
| Allyl methacrylate | 0.19 |
| Water | 39.18 |
| Sodium salt of sulphonated linear (C$_{14}$–C$_{16}$)-paraffin | 0.23 |
| Sulphuric acid | 0.0003 |
| Solution F | |
| Methyl methacrylate | 21.00 |
| Butyl acrylate | 3.12 |
| Styrene | 0.59 |
| Solution G | |
| Water | 30.3 |
| tert.-Butyl-hydroperoxide | 0.044 |
| Solution H | |
| Water | 30.3 |
| Rodite A | 0.13 |

The reactor is maintained at the temperature of 55° C. for 1 hour, and is then cooled.

The so-obtained latex has a content of approximately 34% of polymer, and consists substantially of mono-dispersed particles of grafted acrylic elastomer, with a Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Low haze impact-resistant transparent compositions which comprise:
   (a) 40–99% by weight of a thermoplastic resin based on homopolymers and/or copolymers of alkyl esters of methacrylic acid with alkyl esters of acrylic acid, wherein the alkyl group contains from 1 to 8 carbon atoms; and
   (b) 60–1% by weight of polymeric particles having multilayer structure, diameters in the range from 100 to 300 nm, and coefficient of variation, relative to the average value of particle diameters, less than 0.1, constituted by 8–30% by weight of a central core, comprising:
      a central core based on a cross-linked elastomer intimately blended with an acrylic resin as defined in (a) wherein the amount of elastomer is within the range of from to 0.3 to 7% by weight of the entire particle;

optionally a first layer of said acrylic resin grafted on said central core;

a second layer of cross-linked elastomer grafted on said first resin layer; and a third layer of resin grafted on said second layer of cross-linked elastomer;

said core being made by the following steps:

(i) preparing a seed of elastomer in aqueous emulsion by feeding and polymerizing monomers selected from the alkyl or alkoxylalkyl esters of acrylic acid, wherein the alkyl group contains from 1 to 8 carbon atoms, and those containing a double ethylenic unsaturation, optionally in mixture with amounts of vinylic monomer of up to 30% by weight, and containing from 0.5 to 2% by weight of grafting monomers;

(ii) swelling of the above seed, by absorption of one or more monomers selected from the alkyl esters of methacrylic acid, wherein the alkyl group contains from 1 to 8 carbon atoms, optionally in admixture with minor amounts of $C_1$-$C_8$ alkyl or alkoxy-alkyl esters of acrylic acid, and containing 0.05-2% by weight of grafting monomers, said swelling being carried out to such an extent to obtain final particles with the above-mentioned coefficient of variation of diameters; and (iii) polymerizing said alkyl esters absorbed in the elastomeric seed, to yield the central core.

2. Compositions according to claim 1, wherein the multi-layer polymer is constituted by:

8-30% by weight of central core;
0-55% by weight of the first grafted layer of acrylic resin;
20-50% by weight of cross-linked elastomer present as the second layer; and
15-35% by weight of external acrylic resin present as the third layer.

3. Composition according to claim 1 or 2, wherein the multi-layer polymer is constituted by:

8-30% by weight of central core;
10-40% by weight of the first grafted layer of acrylic resin;
25-45% by weight of cross-linked elastomer present as the second layer; and
18-30% by weight of external acrylic resin present as the third layer.

4. Composition according to claim 1 or 2, wherein the alkyl esters of methacrylic acid are selected from the class consisting of methyl methacrylate, ethyl methacrylate, isopropyl methacrylate, sec.-butyl methacrylate and tert.-butyl methacrylate, optionally mixed with minor amounts of alkyl or alkoxy-alkyl esters of acrylic acid, or vinyl monomers.

5. Composition according to claim 4, wherein the acrylic resin is methyl methacrylate containing 0-25% by weight, of one or more co-monomers selected from the class consisting of acrylic acid esters, optionally substituted with alkoxy groups, and vinyl monomers.

6. Compositions according to claim 5, wherein the acrylic resin is based on methyl methacrylate containing 5-20% by weight of ethyl or methyl acrylate.

7. Composition according to claim 5, wherein the acrylic acid esters are selected from the group consisting of ethyl, methyl, butyl and isopropyl acrylate.

8. Composition according to claim 5, wherein the alkoxy-alkyl acrylate is 2-methoxy-ethyl acrylate.

9. Composition according to claim 5, wherein the vinyl monomers are selected from the group consisting of acrylo-nitrile, acrylamide and styrene and its derivatives.

10. Compositions according to any of claim 1 or 2, wherein the elastomer as defined in (b) of claim 1 is selected from products having a glass transition temperature equal to, or lower than 25° C.

11. Compositions according to claim 10, wherein the elastomer as defined in (b) of claim 1, is selected from those obtainable from alkyl esters of acrylic acid wherein the alkyl group contains from 1 to 8 carbon atoms, or from alkoxy-alkyl acrylates, or from monomers having a double ethylenic unsaturation, optionally in admixture with amounts of vinylic monomers of up to 30% by weight.

12. Composition according to claim 11, wherein the alkyl esters of acrylic acid are selected from the group consisting of n-butyl acrylate, isobutyl acrylate, 2-ethylhexyl acrylate, methyl acrylate, ethyl acrylate, propyl acrylate and isopropyl acrylate.

13. Composition according to claim 11, wherein the alkoxy-alkyl acrylate is 2-methoxy-ethyl acrylate.

14. Composition according to claim 11, wherein the monomers having a double ethylenic unsaturation are selected from the group consisting of butadiene, substituted butadiene including isoprene, chloroprene and 2,3-dimethylbutadiene.

15. Composition according to claim 11, wherein the vinyl monomer is styrene or its derivatives.

16. Composition according to claim 15, wherein the styrene derivative is ortho- or para-methyl-styrene, ortho-or para-ethyl-styrene, alpha-methyl-styrene, or mono-, di-, tri-, tetra- or penta-chloro-styrene.

17. Composition according to claim 11, wherein the elastomer as defined in (b) of claim 1, is a copolymer of butyl acrylate containing styrene in amounts within the range of from 5 to 30% by weight.

18. Compositions according to claim 1 or 2, comprising from 0.05 to 2% by weight, per each individual layer, including the central core, of grafting and cross-linking monomers selected from the class consisting of allyl acrylate, diallyl maleate, allyl methacrylate, diallyl phthalate, diallyl fumarate and triallyl cyanurate.

19. Compositions according to claim 1 or 2, having the following properties:

light transmittance at room temperatures: higher than 90%;
haze at room temperature: within the range of from 1.5 to 2.5;
light transmittance at 50° C.: higher than 80%;
haze at 50° C.: lower than 10%;
"color reversal": absent;
flexural elastic modulus: within the range of from 1000 to 3000 MPa;
tensile yielding stress: within the range of from 25 to 60 MPa;
elongation at break, by tensile stress: within the range of from 25 to 100%;
"Charpy" inmpact resistance: within the range of from 2 to 10 kJ/m$^2$;
"Charpy" impact resistance, with sharp notch: within the range of from 1 to 6 kJ/m$^2$;
Rockwell hardness: within the range of from 35 to 90 (scale M); and
Vicat grade (5 kg, 50° C./min): within the range of from 80° to 100° C.

20. Composition according to claim 1, wherein the optional first layer of said acrylic resin grafted on said central core is present.

21. Process for preparing low haze impact-resistant transparent compositions according to claim 1 or 2, comprising blending:
(a) 40-99% by weight of an acrylic resin based on homopolymers and/or copolymers of alkyl esters of methacrylic acid with alkyl esters of acrylic acid, wherein the alkyl group contains from 1 to 8 carbon atoms; and
(b) 60-1% by weight of a polymer having a multi-layer structure, obtained according to the following steps:
(i) preparation of a seed of elastomer in aqueous emulsion by means of feed and polymerization of monomers selected from the alkyl or alkoxy-alkyl esters of acrylic acid, wherein the alkyl group contains from 1 to 8 carbon atoms, and those containing a double ethylenic unsaturation, optionally in mixture with amounts of vinylic monomer of up to 30% by weight, and containing from 0.05 to 2% by weight of grafting monomers;
(ii) swelling of the above seed, by means of the absorption of one or more monomers selected from the alkyl esters of methacrylic acid, wherein the alkyl group contains from 1 to 8 carbon atoms, optionally in admixture with minor amounts of $C_1$-$C_8$ alkyl or alkoxy-alkyl esters of acrylic acid, and containing 0.05-2% by weight of grafting monomers;
(iii) polymerization of said alkyl esters absorbed in the elastomeric seed, to yield the central core;
(iv) optional growth of said central core with a first layer of acrylic resin by means of the feed and polymerization of acrylic esters of methacrylic acid, optionally in mixture with minor amounts of $C_1$-$C_8$ alkyl or alkoxy-alkyl esters of acrylic acid, and containing 0.05-2% by weight of grafting monomers;
(v) growth of the so-obtained particles with a second layer of elastomer, grafted on the first layer by means of the feed and polymerization of monomers selected from the $C_1$-$C_8$ alkyl or alkoxy-alkyl esters of acrylic acid, and those having a double ethylenic unsaturation, optionally in admixture with amounts of vinylic monomer of up to 30% by weight, and containing 0.05-2% by weight of grafting monomers;
(vi) growth of the so-obtained particles with a third layer of resin, grafted on the second layer of elastomer, by means of the feed and polymerization of acrylic esters of methacrylic acid, optionally in mixture with minor amounts of $C_1$-$C_8$ alkyl or alkoxy-alkyl esters of acrylic acid and of vinylic monomers, until the desired particle size is reached.

22. Process according to claim 21, wherein the polymerization reactions described in the steps from (i) to (vi) are carried out batchwise or semi-continuously, at temperatures within the range of from 15° to 60° C. in case of a batchwise reaction mode, and of from 30° to 70° C. in case of a semi-continuous reaction mode.

23. Process according to claim 21, wherein at the end of the operations (i) to (vi), an aqueous emulsion is obtained of polymeric particles having a multi-layer structure, at a concentration of from 25 to 50% by weight, and having diameters within the range of from 100 to 300 nm.

* * * * *